United States Patent [19]

Wilkens

[11] Patent Number: 5,325,957
[45] Date of Patent: Jul. 5, 1994

[54] BEARING FOR RECIPROCATING FLOOR CONVEYOR

[76] Inventor: Arthur Wilkens, R.R. 2, Box 46A, Osborne, Kans. 67473

[21] Appl. No.: 110,505

[22] Filed: Aug. 23, 1993

[51] Int. Cl.⁵ .............................................. B65G 25/04
[52] U.S. Cl. ................................... 198/750; 414/525.1
[58] Field of Search ..................... 198/750; 414/525.1, 414/525.9

[56] References Cited

U.S. PATENT DOCUMENTS

| | | |
|---|---|---|
| Re. 33,196 | 4/1990 | Foster . |
| 4,144,963 | 3/1979 | Hallstrom . |
| 4,492,303 | 1/1985 | Foster . |
| 4,611,708 | 9/1986 | Foster . |
| 4,679,686 | 7/1987 | Foster . |
| 4,727,978 | 3/1988 | Hallstrom, Jr. . |
| 4,749,075 | 6/1988 | Foster . |
| 4,785,929 | 11/1988 | Foster . |
| 4,793,469 | 12/1988 | Foster . |
| 4,823,938 | 4/1989 | Foster . |
| 4,856,645 | 8/1989 | Hallstrom, Jr. . |
| 4,858,748 | 8/1989 | Foster . |
| 4,899,870 | 2/1990 | Foster . |
| 4,907,691 | 3/1990 | Foster . |
| 4,923,356 | 5/1990 | Foster . |
| 4,940,132 | 7/1990 | Foster . |
| 4,962,848 | 10/1990 | Foster . |
| 4,984,679 | 1/1991 | Foster . |
| 4,990,048 | 2/1991 | Foster . |
| 5,064,052 | 11/1991 | Foster . |
| 5,096,356 | 3/1992 | Foster . |
| 5,125,502 | 6/1992 | Foster . |
| 5,139,133 | 8/1992 | Foster . |
| 5,145,309 | 9/1992 | Foster . |

Primary Examiner—D. Glenn Dayoan
Attorney, Agent, or Firm—Reising, Ethington, Barnard, Perry & Milton

[57] ABSTRACT

The reciprocating floor conveyor (10) includes a plurality of parallel guide tube assemblies (46) that are attached to cross beams (28). A single bearing (54) extends the full length of the guide tube assembly and is attached to each guide tube guide tube assembly (46). A floor slat (50) is supported by each bearing (54). A floor slat drive assembly (48) is attached to the floor slats (50) to reciprocate the floor slat (50) back and forth and to convey cargo supported by the floor slats (50). The bearings (54) have an upwardly facing bearing surface (60) and side walls (64 and 66) with floor slat retainer surfaces (80 and 82) that cooperate wit the floor slats (50) to restrain vertical movement of the floor slats relative to the bearing and which protect and shield the upwardly facing bearing surface (60) on the bearings and the bottom surface (98) on the floor slats from liquids and solid materials.

9 Claims, 6 Drawing Sheets

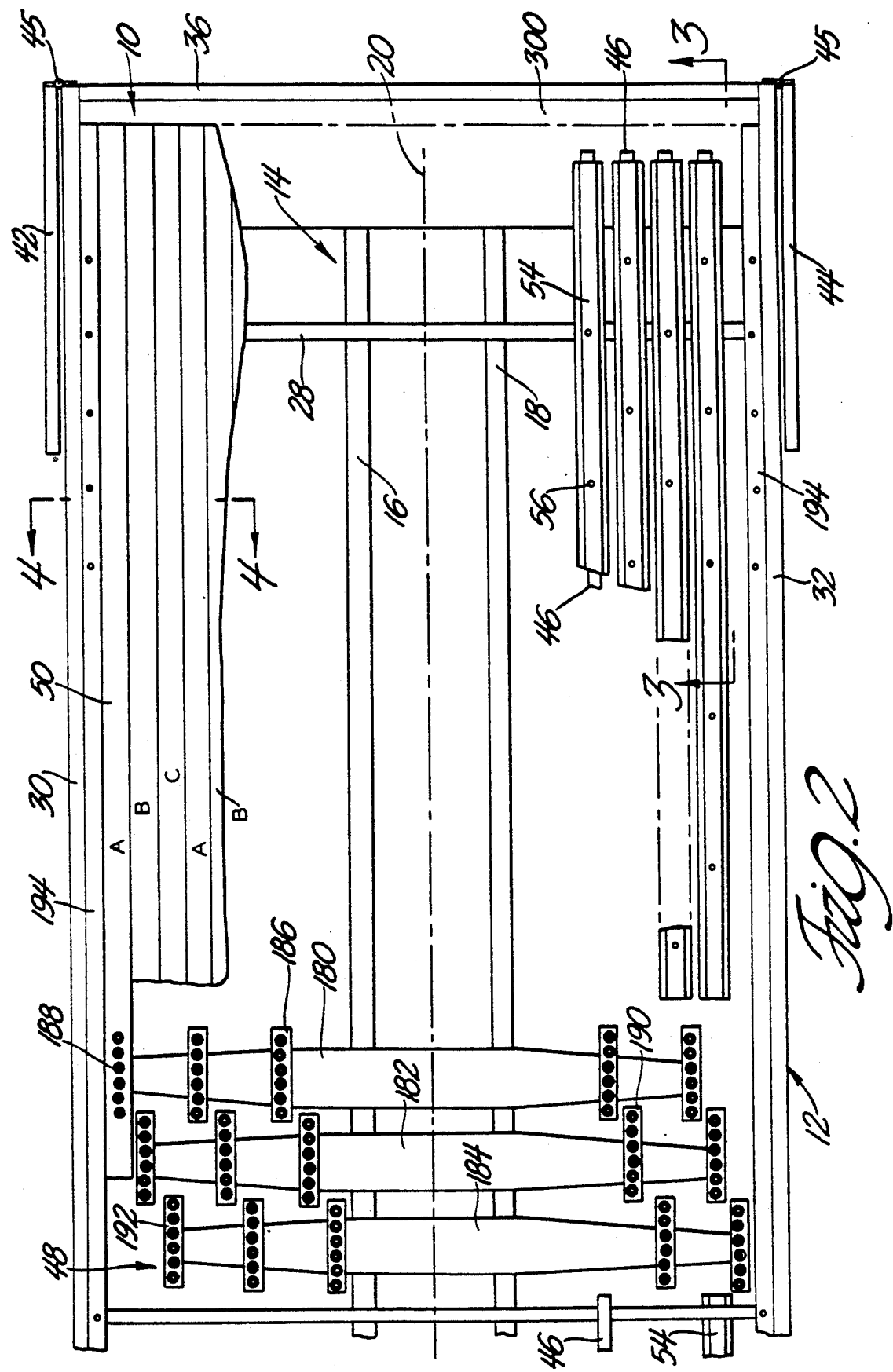

BEARING FOR RECIPROCATING FLOOR CONVEYOR

TECHNICAL FIELD

This invention relates to reciprocating floor conveyors and particularly to bearings which support the floor slats of a reciprocating floor conveyor.

BACKGROUND OF THE INVENTION

Reciprocating floor conveyors have been used for several years in van bodies and in trailers for unloading cargo. These conveyor systems are widely used in va bodies and trailers for transporting bulk material such as ground plant material for animal feed, saw dust, wood chips, bark, and plant material for human consumption. Reciprocating floor conveyors are also used in stationary installations to convey material. Stationary reciprocating floor conveyors are used to meter bulk material for a variety of purposes such as refuse sorting and feeding solid fuel into a boiler. The conveyor systems include a plurality of parallel floor slats. Each floor slat is mounted so that it can slide back and forth in a direction parallel to its long axis. The floor slats are reciprocated back and forth in a sequence that results in cargo supported on the floor slats being conveyed toward one end of the floor slats.

Several different drives and drive systems have been employed in reciprocating floor conveyors to reciprocate the floor slats back and forth. A commonly used drive system includes three hydraulic cylinders that move all the slats simultaneously to the rear toward a rear discharge carrying cargo with them. The first cylinder is connected to every third floor slat. The second cylinder is connected to all the floor slats that are adjacent to a common side of the floor slats attached to the first cylinder. The third cylinder is attached to the floor slats that are between the floor slats driven by the first cylinder and the floor slats driven by the second cylinder. The first, second and third cylinders are activated one at a time to move every third floor slat forward and away from the rear discharge without moving cargo forward. The floor slats do not carry cargo forward because two thirds of the floor slats that are stationary, while one cylinder moves one third of the floor slats forward, hold the cargo. The second cylinder moves the floor slats connected to it forward while the floor slats connected to the first and third cylinders remain stationary. The third cylinder then moves the floor slats connected to the third cylinder forward while the floor slats connected to the first and second cylinders remain stationary. The above procedure is then repeated to move cargo through the rear discharge opening. The procedure continues to be repeated until all the cargo is discharged. The conveying cycle can be stopped and restarted as required to control the rate of material discharge.

The floor slats that are currently used are generally extruded aluminum members. Each floor slat has a generally horizontal upper section, spaced apart sides that extend downwardly from the bottom of the horizontal upper section and generally horizontal flanges on the lower edges of each side wall that extend inwardly toward each other. The floor slats are supported by bearings made from a low friction material. The bearings are attached to guide beams and cross beams. A guide beam extends substantially the length of each floor slat and is fixed to and supported by a plurality of cross beams. The cross beams are an integral part of the frame of the trailer or van body. The practice is to employ a bearing at each location where a guide beam crosses a cross beam. Trailers with reciprocating floor conveyors that are currently manufactured have about nine hundred to over twelve hundred separate floor slat support bearings.

Each of the current bearings has an upper horizontal bearing surface that contacts and supports the bottom surface of the generally horizontal upper section of a floor slat. Each bearing also has side flanges that can contact the upper surface of the generally horizontal flanges on the lower edge of each side wall of the floor slats to prevent the floor slats from lifting up and away from the bearings.

The bearings are exposed to mud, dust, sand and gravel, and liquids that are thrown up from road surfaces. These materials that are thrown up from the road surface tend to stick to the bottom surface of the generally horizontal upper section of the floor slats between the bearings and to work in between the floor slats and the upper horizontal bearing surface of each bearing when the floor slats are reciprocated back and forth. This foreign material between the floor slats and the bearings increases the force required to reciprocate the floor slats and increases the rate of wear on the floor slats. In time floor slats can wear through where their horizontal upper section is in contact with and supported by a bearing. Wear of the contact surfaces between the horizontal upper section of a floor slat and a bearing can lower the floor slat and allow the sides of the floor slats to contact the cross beams or a bearing surface on the portion of a bearing that is between the cross beams and the sides of a floor slat. Such contact will result in wear on the sides of the floor slats. Wear on the sides of the floor slats will decrease the strength of the floor slats and may in time destroy the floor slats.

The time required to install nine hundred to twelve hundred bearings during manufacture of a floor conveyor is significant. Depending upon the specific design it may be necessary to manually align each floor slat with each bearing during installation of the floor slats. These time consuming tasks increase the cost of manufacturing a reciprocating floor conveyor and also increase the time required to repair a reciprocating floor conveyor.

The bearings that are currently used may slide back and forth a short distance relative to the guide beams and the cross beams. Such movement of the bearings relative to the guide beams generally does not cause any significant wear or damage. However, bearings which are able to slide around on the guide beams and cross beams do not positively position and hold floor slats as well as may be desired. Improper positioning of floor slats will result in improper sealing between adjacent floor slats and loss of cargo. The improper positioning of floor slats may also result in damaged floor slats.

SUMMARY OF THE INVENTION

An object of the invention is to provide a reciprocating floor conveyor with continuous bearings that shield their contact surface on floor slats from liquid and other material or materials which are thrown toward the bottom of the floor slats and the continuous bearings.

Another object of the invention is to provide a reciprocating floor conveyor with a minimal number of bearings.

A further object of the invention is to provide bearings for reciprocating floor conveyor floor slats that are rigidly secured to the frame by fasteners.

A still further object of the invention is to provide bearings for reciprocating floor conveyor floor slats that maximize the contact surface area between the floor slats and the bearings.

The reciprocating floor conveyor is mounted on a frame that includes cross beams. Floor slat guide tubes are attached to the cross beams to guide each floor slat. The guide tubes include a front and rear portion for guiding each floor slat. There is generally a space between the front section and the rear section of the guide tube for each floor slat that provides space for a drive assembly that reciprocates the floor slats back and forth. If the drive assembly is connected to the floor slats at the rear of the floor slats or at the front of the floor slats, a space between the front section and the rear section of each guide tube is not required. It would also be possible to connect a drive assembly to floor slats in the space between adjacent guide tubes thereby allowing each guide tube to extend substantially the entire length of the floor slats.

The guide tubes are generally tubular aluminum members. It is common to use guide tubes with a square cross section as well as ones with a rectangular cross section. Some materials can be conveyed efficiently by reciprocating floor conveyors that have relatively wide floor slats. When wide floor slats are used, the guide tube for each floor slat may include two parallel side by side tubes with a square or rectangular cross section.

An extruded plastic bearing is secured to each guide tube or guide tube assembly. The bearing extends substantially the length of the guide tube or the guide tube section to which the bearing is attached. The bearing is secured to the guide tube or the guide tube section by rivets, bolts or similar fasteners.

The extruded plastic bearing has a top portion with a generally horizontal bearing surface that contacts and supports a floor slat. Sides extend downwardly from the top portion of the bearing. The sides of the bearing are either in direct contact with the sides of a guide tube or guide tube assembly or include inner side bearing flanges that are in contact with a guide tube. Outer flanges on the bearing sides extend outwardly and limit upward move of a floor slat relative to the bearing by contacting flanges on the floor slat sides.

The floor slats have a generally horizonal upper portion and two side walls that extend the length of the floor slat and that extend downwardly from the bottom of the horizonal upper portion. Flanges on the lower edge of each of the side walls extend inwardly toward each other. The flanges on the side walls limit upward movement of the floor slats relative to the bearings by contacting surfaces on the bearing side walls if the floor slats start to raise relative to the bearings.

A floor slat drive assembly is connected to each floor slat. The drive assembly is normally attached to the bottom of each floor slat between the forward end and the discharge end of each floor slat. To convey material, all of the floor slats are moved to the rear together to convey material toward the rear discharge opening. After all the floor slats are in a rear position, a first of three series of floor slats is moved forward while the second and third series remain stationary. After the first series of floor slats is moved forward, the second series of floor slats is moved forward while the first and third series of floor slats remain stationary. After the second series of floor slats is moved forward, the third series of floor slats is moved forward while the first and second series of floor slats remain stationary. All three series of floor slats are then ready to move to the rear together and convey cargo to the rear discharge thereby staring the conveying cycle over. Reciprocation of the floor slats is continued until the trailer or van body is unloaded or until it is decided to discontinue conveying cargo. Each series of floor slats includes every third floor slat.

The forgoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 2 is a planned view of a portion of the reciprocating floor conveyor in a semi-trailer with some parts removed and other parts broken away to show the floor construction;

DESCRIPTION OF A PREFERRED EMBODIMENT

Figure 1:
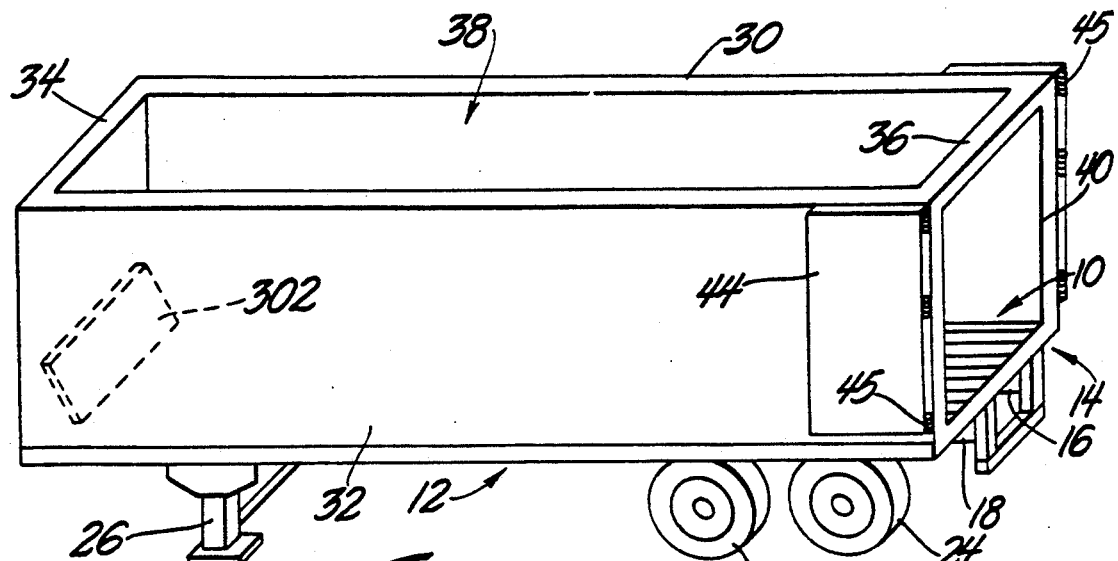
FIG. 1 is perspective view of a semi-trailer, employing a reciprocating floor conveyor, for transporting bulk material.
Figure 3:
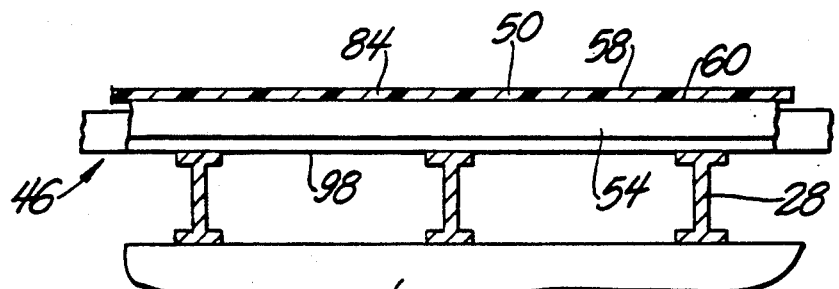
FIG. 3 is an enlarged sectional view of a portion of a reciprocating floor conveyor taken along line 3—3 in FIG. 2.

The reciprocating floor conveyor 10 for bulk materials is shown in the drawing as part of a semi-trailer 12. The reciprocating floor conveyor 10 could also be part of a van type body mounted on a truck chassis or part of a stationary material handling system. The semi-trailer 12, as shown in FIG. 1, has a main frame 14 which includes a pair of spaced-apart channel members 16 and 18 that are parallel to a central axis 20 running the length of the semi-trailer 12. The rear portion of the semi-trailer 12 is supported by wheels and tires 22 and 24 that are rotatably journaled on conventional axles which are attached to the main frame 14 by a conventional suspension system (not shown). The front portion of a semi-trailer 12 is supported by an adjustable landing gear 26 when the semi-trailer is not connected to a towing vehicle. A hitch pin (not shown), for attaching the semi-trailer 12 to a fifth wheel on a tractor, is attached to the bottom side of the main frame 14 on the central axis 20 of a semi-trailer 12 forward of the landing gear 26. The channel members 16 and 18 end at a point to the rear of the hitch pin and are indirectly attached to the hitch pin to keep the height of the reciprocating floor conveyor 10 at the front of the semi-trailer 12 at about the same height as the height of the reciprocating floor conveyor at the rear of the semi-trailer.

A plurality of cross beams 28 that are transversed to the center line 20 are attached to the main frame 14. Cross beams 28, as shown, are aluminum I-beams. The spacing of the cross beams 28 depends upon the intended use and the cargo the reciprocating floor conveyor 10 is to support. The cross beams 28 have been placed on twelve inch centers in some semi-trailers 12. In other semi-trailers 12, the center lines of the cross beams 28 have been as much as fifteen inches apart.

A right side wall 30 is attached to the right hand ends of the cross beams 28. A left side wall 32 is attached to the left hand ends of the cross beams 28. A front end wall 34 is attached to the right side wall 30, the left side wall 32 and to the front portion of the main frame 14. The top and bottom of the right side wall 30, the left side wall 32 and the front end wall 34 are reinforced to provide structural integrity. A cross beam 36 is connected to the top of the right side wall 30 and the left side wall 32 at the rear of the semi-trailer 12 to reinforce the cargo container 38 and to define a rear discharge opening 40 that is substantially the same height and width as the cargo container 38. Doors 42 and 44 for closing the discharge opening 40 are attached to the right side wall 30 and the left side wall 32 by hinges 45. The top of the semi-trailer 12 is open for depositing cargo in the cargo container 38.

A plurality of guide beam assemblies 46, that are parallel to the central axis 20 are welded to the tops of the cross beams 28. The guide beam assemblies 46 are tubes that extend substantially the entire length of the semi-trailer 12. The guide beam assemblies 46 each have an end that is adjacent to the front end wall 34 and an end that is adjacent to the doors 42 and 44 when the doors are closing the rear discharge opening 40. There is a section removed from each guide beam assembly 46 in the center portion of the semi-trailer 12 for a floor slat drive assembly 48, as shown in the drawing. The guide beam assemblies 46 are on centers that are spaced apart a distance equal to the width of the floor slats 50. If the width of each floor slat 50 is three and five eighths of an inch, center lines of the guide beam assemblies 46 are also three and five eighths of an inch apart. The number of guide beam assemblies 46 required depends upon the inside width of the cargo container 38 and the width of the floor slats 50. In some reciprocating floor conveyors 10, twenty four or even more guide beam assemblies 46 are required.

Figure 4:
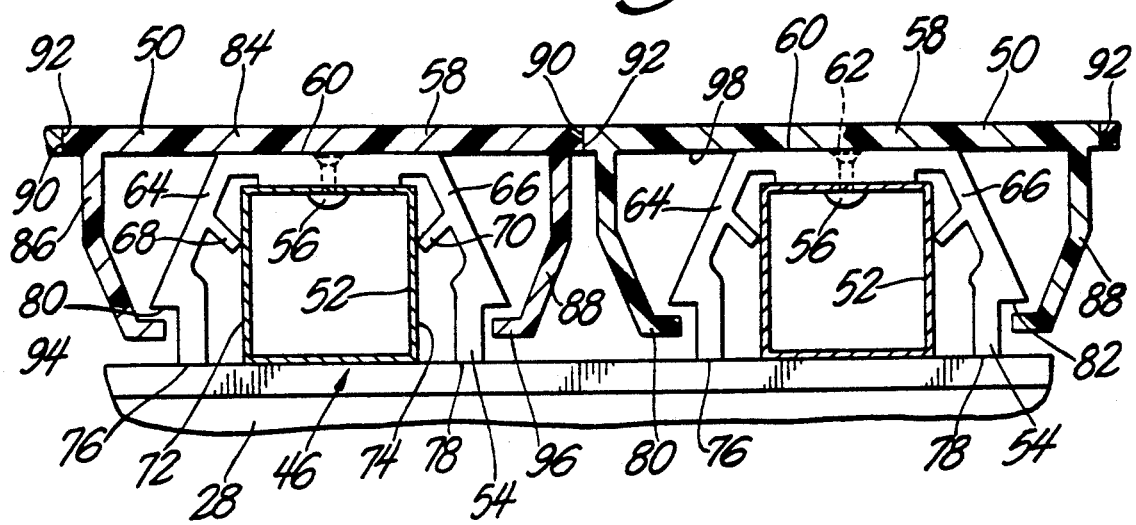
FIG. 4 is an enlarged sectional view of a portion of a reciprocating floor conveyor structure including floor slats, bearings, guide tube assemblies and a cross beam taken along line 4—4 in FIG. 2.
Figure 7:
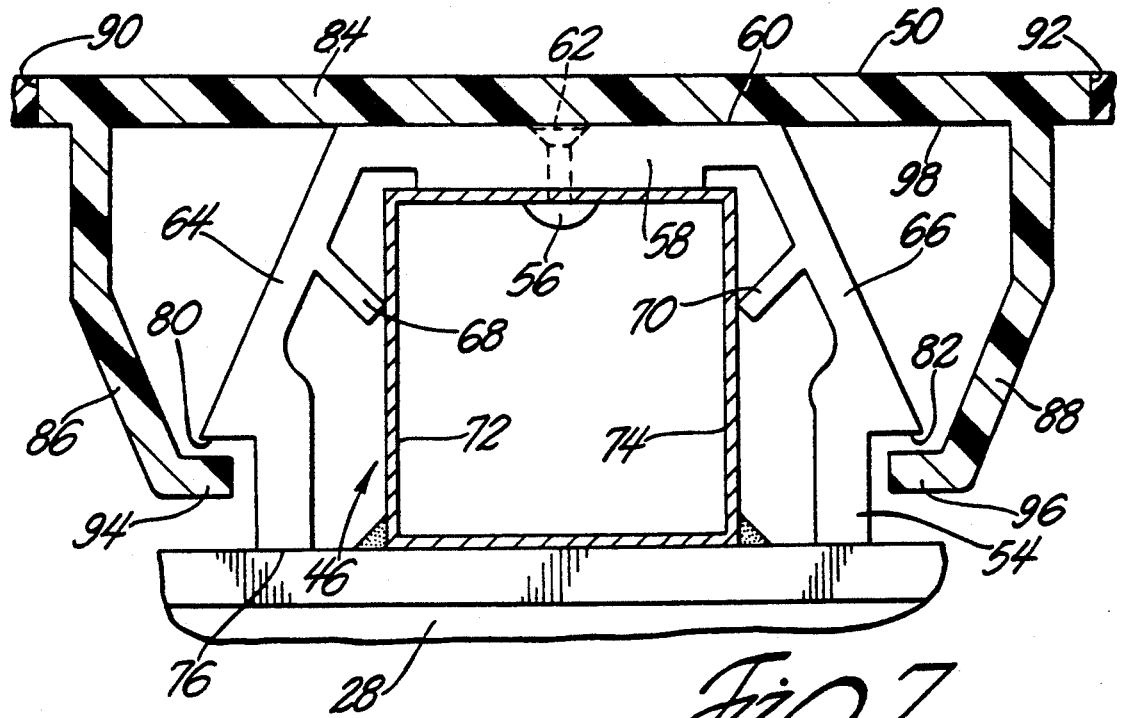
FIG. 7 is an enlarged end view of a floor slat supported by an extruded plastic bearing that is secured to a square guide tube.

Each guide beam assembly 46, is shown in FIGS. 4 and 7 as a square tube 52. The square tube 52 is parallel to the center line 20 and is welded to the cross beams 28. As shown in FIG. 2 a section of each guide tube assembly 46 has been removed to provide space for the floor slat drive assembly 48. It would be possible to design a floor slat drive assembly 48 that does not require the removal of a section of each guide beam assembly 46. The floor slat drive assembly 48 could, for example, be attached to ends of the floor slats 50 rather than being attached some place between the forward end and the rear end of each floor slat. The square tube 52 can vary in size. The size depends upon the width of the floor slat 50, the strength required and the desire of the manufacturer. One manufacturer has used one inch square tubing. The wall thickness of the tube 52 can also vary to provide the required strength. If necessary, the square tube 52 could be a solid rod.

A bearing 54 is attached to each guide tube assembly 46 by rivets 56, bolts or other suitable fasteners. The bearing 54 preferably extends the entire length of the guide tube assembly 46. It may, however, be necessary to remove a portion of the bearing 54 to provide space for the floor slat drive assembly 48. A portion can be removed by using two bearings 54 of the required lengths for each section of the guide tube assembly 46. The front section of the guide tube assembly extends from the front end wall 34 to the floor slat drive assembly 48. The rear section of the guide tube assembly 46 extends from the floor slat drive assembly 48 to the rear discharge opening 40. A bearing 54 is attached to the front section of the guide tube assembly 46. Another bearing 54 is attached to the rear section of the guide tube assembly 46. Each bearing 54 is a low friction material. Extrusion is a preferred method of forming the bearing 54 but it could also be cast. A thermo-plastic resin such as alatron is a suitable material to use for the bearings 54.

The bearing 54, shown in FIG. 4, has a generally horizontal upper section 58 with an upwardly facing bearing surface 60. The rivets 56 which attach to the bearings 54 to the guide tube assemblies 46 are countersunk in the generally horizontal upper section 58 so that the tops of their heads 62 are below the upwardly facing bearing surface 60. Side walls 64 and 66 of the bearings 54 are integral with the generally horizontal upper section 58 and extend downwardly from the upper section. The side walls 64 and 66 have flanges 68 and 70 which contact the sides 72 and 74 of the guide tube assembly 46 to laterally position the bearing 54 on the guide tube assembly. The lower surfaces 76 and 78 of the side walls 64 and 66 contact the tops of the cross beams 28 to provide support to the side walls, as shown in FIG. 4. Each side wall 64 and 66 includes a downwardly facing horizontal floor slat retainer surface 80 or 82. The function of the floor slat retainer surfaces 80 and 82 is described below.

The floor slats 50 can take many forms and can be made from different materials. Floor slats 50 are, however, frequently aluminum extrusions with a horizontal upper section 84 and downwardly extending integral walls 86 and 88 that form a channel shaped member. The sides of the horizontal upper section 84 have generally vertical bearing surfaces 90 and 92. The generally vertical bearing surfaces 90 and 92 contact the bearing surfaces on adjacent floor slats 50 to limit lateral movement of the floor slats and to support lateral forces when the reciprocating floor conveyor is tilted to one side. The vertical bearing surfaces 90 and 92 also function as sealing surfaces to prevent the loss of cargo between adjacent floor slats 50. Generally horizontal flanges 94 and 96 are integral with the side walls 86 and 88. The horizontal flanges 94 and 96 extend inwardly toward each other. The horizontal flanges 94 and 96 also cooperate with the floor slat retainer surfaces 80 and 82 on the side walls 64 and 66 of the bearings 54 to limit vertical movement of the floor slats 50 relative to the bearings. The floor slats 50 can be installed by sliding them onto the bearings 54 from the ends of the bearings. The floor slats 50 can also be installed by forcing them vertically downward on the bearings 54 thereby deflecting the side walls 64 and 66 of the bearings inward until the floor slats snap into place and the side wall return to their original shape. The floor slats 50 extend substantially the entire length of the semi-trailer 12 in which the reciprocating floor conveyor 10 is mounted. With the longer semi-trailers that are now in use, floor slats 50 may be fifty feet or long or longer. The reciprocating floor conveyors in stationary installations, rail cars, ships, and aircraft can have floor slats 50 that are much longer than those in semi-trailers 12. The upwardly facing bearing surface 60 of the bearings 54 are in sliding contact with the bottom surface 98 of the horizontal upper section 84 of the floor slats 50 over substantially the entire length of the floor slats. This essentially continuous contact over the entire length of the floor slats 50 increases the bearing area that supports the floor slats. The increased area reduces floor slat 50 and bearing 54 wear. The essentially continuous contact between the floor slat 50 and the bearing surface 60 of the bearings 54 also reduce the possibility of foreign material, that can increase friction and increase wear, contacting the upwardly facing bearing surface 60 of the bearings 54. The horizontal flanges 94 and 96 on the floor slats 50 overlap and cooperate with the downwardly facing floor slat retainer surfaces 80 and 82 on the bearings 54 to essentially enclose the generally horizontal upper section 58 and upwardly facing bearing surface 60 of the bearings. There is some space between the horizontal flanges 94 and 96 and the downwardly facing floor slat retainer surfaces 80 and 82 to permit any foreign particles or liquids that could contact the upwardly facing bearing surface 60, to fall out. The ends of the floor slats 50 and the floor slat drive assembly 48 provide the only direct access, for foreign material and liquids, to the bottom surface 98 of horizontal upper section 84 of the floor slats 50 and the upwardly facing bearing surface 60 of the bearings 54. The increased contact surface between the bearing 54 and the floor slat 50 and the enclosure of the contact surfaces decreases wear and increases the useful life of the floor slats and the bearings. The generally horizontal flanges 94 and 96 on the floor slats 50 are held up out of contact with the cross beams 28 by the bearings 54 to prevent wear on the side walls 86 and 88 that would weaken the floor slats 50 and reduce their useful life.

Figure 8:
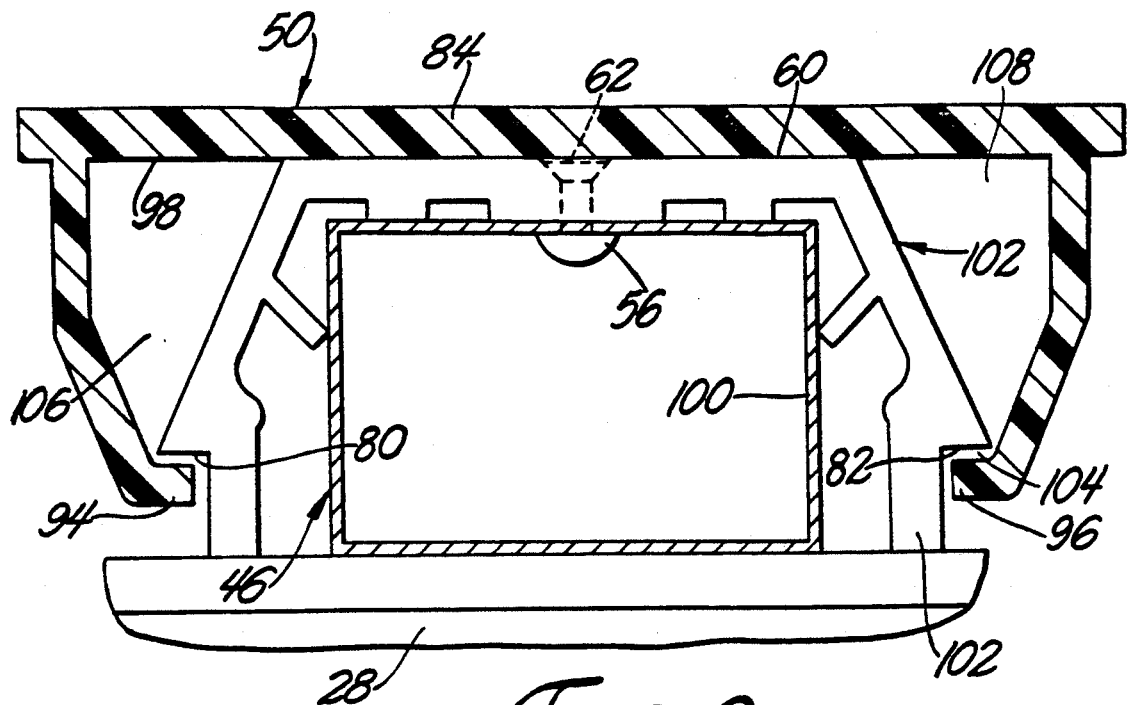
FIG. 8 is an enlarged end view of a floor slat supported by an extruded plastic bearing that is secured to a rectangular guide tube.

A guide tube assembly 46 with a rectangular tube 100 is shown in FIG. 8. Rectangular tubes 100 are commonly used, in reciprocating floor conveyors 10, that are two inches wide and either one inch or one and one half inch high. The rectangular tube 100 functions just like the square tube 52, shown in FIGS. 4 and 7. The walls of the rectangular tube 100 have the required thickness to provide the necessary strength as explained above. A bearing 102 is attached to the rectangular tube 100 by rivet 56. The space inside the bearing 102 which receives the rectangular tube 100 is the proper width and height to receive the rectangular tube. With exception of the dimensions, the bearing 102 is identical to the bearing 54 described above. The space 104 between the horizontal flanges 94 and 96 on the floor slats 50 and the downwardly facing horizontal floor slat retainer surfaces 80 and 82 is sufficiently large to allow any liquid or small solids in the chambers 106 and 108 to fall out. The space 104 is, however, sufficiently small to keep liquids and solids from entering the chambers 106 and 108 and contaminating the upwardly facing bearing surface 60 and the portion of the bottom surface 98 of the horizontal upper section 84 of the floor slat 50 which contacts the bearing surface on the bearing 102.

The passage of liquids and solids through the space 104 and into the chambers 106 and 108 is also inhibited by the requirement to make at least two 90° changes in direction during passage through the space 104.

Figure 9:
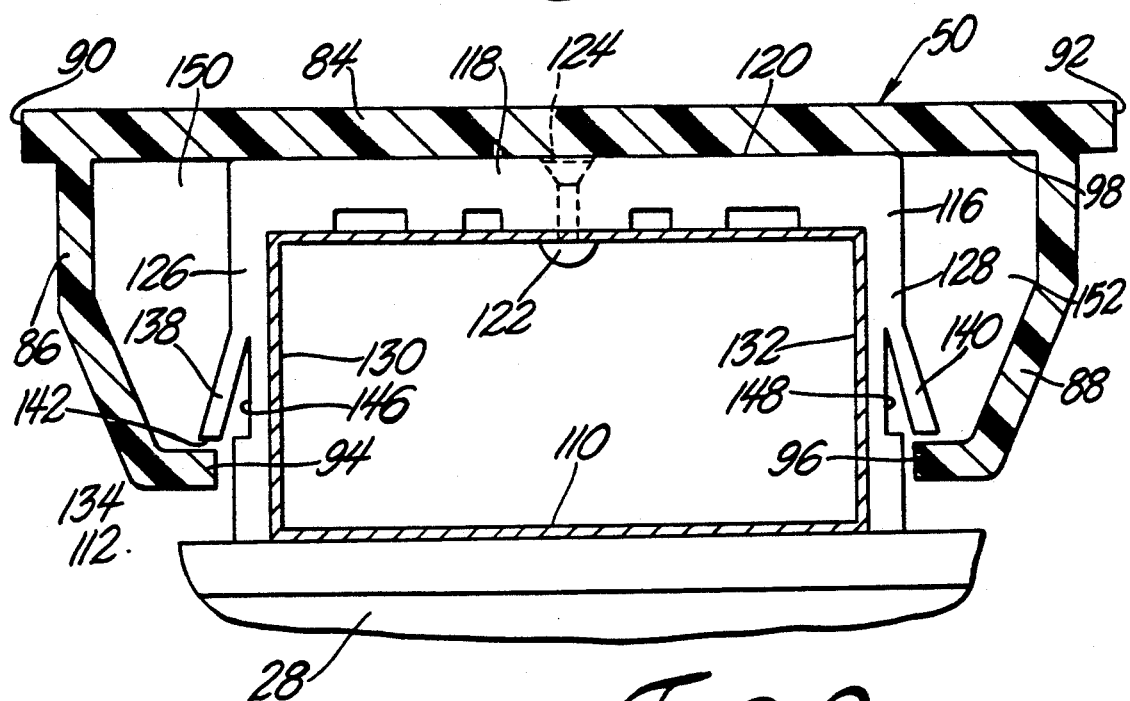
FIG. 9 is an enlarged end view of a floor slat supported by a modified extruded plastic bearing that is secured to a rectangular guide tube.

A guide tube assembly 46 with a rectangular tube 110 is shown in FIG. 9. The rectangular tube 110 is attached to the cross beams 28 by welding a shown at 112 and 114. The bearing 116, as shown in FIG. 9 is substantially different than the bearing 54 described above. The bearings 116 are, like the bearing 54, extruded or cast from a thermoplastic resin with low friction characteristics and extend substantially the length of the guide tube assemblies 46. The generally horizontal upper section 118 of the bearing 116 with an upwardly facing bearing surface 120 is attached to the rectangular tube 110 by rivets 122, screws or other suitable fasteners. The heads 124 of the rivets, bolts or other fasteners are countersunk so that their tops are below the upwardly facing bearing surface 120 on each bearing 116. The side walls 126 and 128 of the bearings 116 are integral with the generally horizontal upper section 118 of the bearings, and extend downwardly adjacent to the side walls 130 and 132 of the rectangular tube 110. As shown, the side walls 126 and 128 extend downwardly to the cross beam 28. The side walls 126 and 128 of the bearings 116 have beveled surfaces 134 and 136 that provide space for the welds 112 and 114. Flexible flanges 138 and 140 extend downwardly and outwardly from each of the sides 126 and 128 of the bearings 116. The downwardly facing floor slat retainer surfaces 142 and 144 on the flexible flanges 138 and 140 are positioned directly above the generally horizontal flanges 94 and 96 on the side walls 86 and 88 of the floor slat 50 and contact the horizontal flanges on the floor slats to limit upward movement of the floor slats relative to the bearings 116. Floor slats 50 can be mounted on the bearings 116 by being slid on from one end. The floor slats 50 can also be forced down over the bearings 116. When the floor slats 50 are forced down over the bearings 116 the flexible flanges 138 and 140 are contacted by the horizontal flanges 94 and 96 on the floor slats 50 and the flexible flanges are cammed into recesses 146 and 148 in the sides 126 and 128 of the bearings. When the bottom surface 98 of the horizontal upper section 84 of a floor slat 50 is in contact with the upperwardly facing bearing surface 120 on the bearing 116, the flexible flanges 138 and 140 spring back out of the recesses 146 and 148.

The bearing 116 allows the bearing surface 120 to be substantially the same width as the space between the horizontal flanges 94 and 96 on a floor slat 50. The flexible flanges 138 and 140 cooperate with the horizontal flanges 94 and 96 on the floor slat 50 to keep moisture and solid material out of the chambers 150 and 152 and away from the upwardly facing bearing surface 120 on the bearing 116. Sufficient space is provided between the flexible flanges 138 and 140 and the generally horizontal flanges 94 and 96 to allow liquid and solids out of the chambers 150 and 152 to prevent contamination of the upwardly facing bearing surface 120.

Figure 10:
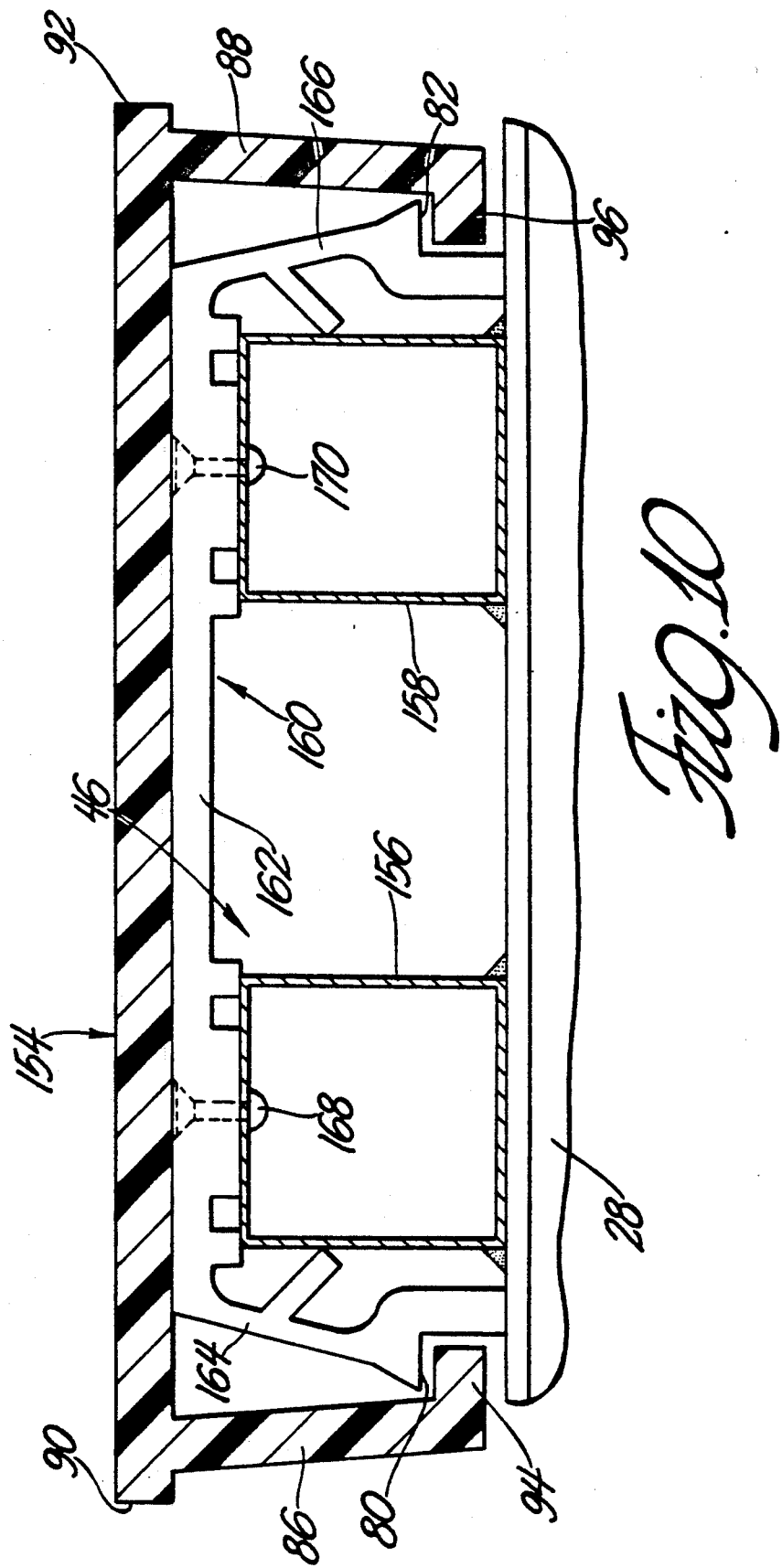
FIG. 10 is an end view of a floor slat supported by an extruded plastic bearing that is attached to a guide tube assembly with two square tubes.

A guide tube assembly 46, is shown in FIG. 10, for a wide floor slat 154. The guide beam assembly 46 includes two parallel square tubes 156 and 158. The square tubes 156 and 158 are welded to the cross beams 28 with some space between them. A bearing 160 with a horizontal upper section 162 and downwardly extending integral walls 164 and 166 is attached to the square tubes 156 and 158 by rivets 168 and 170. The bearing 160 is essentially identical to the bearing 54 shown in FIG. 4 except that the horizontal upper section 162 is substantially wider and it is attached to the guide tube assembly 46 with two parallel square tubes 156 and 158.

The floor slat drive assembly 48 includes transverse drive beams 180, 182 and 184. The transverse drive beam 180 has a plurality of spaced apart floor slat connectors 186 that are connected to each A floor slat 50 or 154 by bolts 188. The transverse drive beam 182 has a plurality of spaced apart floor slat connectors 190 which are connected to each B floor slat 50 or 154 by bolts 188. The B floor slats 50 or 154, as shown in FIG. 2, are on the left hand side of each A floor slat. The transverse drive beam 184 has a plurality of spaced apart floor slat connectors 192 which are connected to each C floor slat 50 or 154 by bolts 188. The C floor slats 50 or 154 are positioned between each A floor slat and B floor slat. The bearing surfaces 90 or 92 on each of the A, B and C floor slats 50 are in sealing contact with the bearing surfaces on the floor slats adjacent to their right and left sides. At the right and left edges of the reciprocating floor conveyor 10 adjacent to the right side wall 30 and the left side wall 32 is a nonreciprocating half floor slat 194. The half floor slat 194 has been cut through the horizontal upper section 84 along its entire length. The left half of the floor slat 194 is bolted to the cross beams 28 adjacent to the right side wall 30 with its integral left side wall 86 to the left. The right half of the floor slat 194 is bolted to the cross beams 28 adjacent to the left side wall 32 with its right integral side wall 88 to the right. The two half floor slats 194 can be adjusted horizontally toward and away from the central axis 20 of the trailer to establish sealing contact between all the floor slat bearing surfaces 90 and 92. The horizontal adjustment of the half floor slats 194 toward or away from the central axis 20 can be made at the time of assembly or slots can be provided for the bolts that secure the half floor slats to the cross beams 28 to facilitate field adjustment. The floor slats 50 or 154 can move laterally on the bearings 54 toward or away from the center line 20 to ensure that bearing surfaces 90 and 92 are in sealing contact with the bearing surfaces on adjacent floor slats. Floor slats with a variety of sealing systems for sealing between adjacent floor slats can be used. With these floor slats bearing surfaces 90 and 92 may or may not be employed. If floor slats 50 or 154 do not have bearing surfaces 90 or 92 that contact adjacent floor slats, to latterly position each floor slat, an alternate system to latterly restrain the floor slats is required. Such an alternate system could include surfaces on the bearings 54, 102, 116 or 160 that latterly restrains floor slats.

Figure 6:
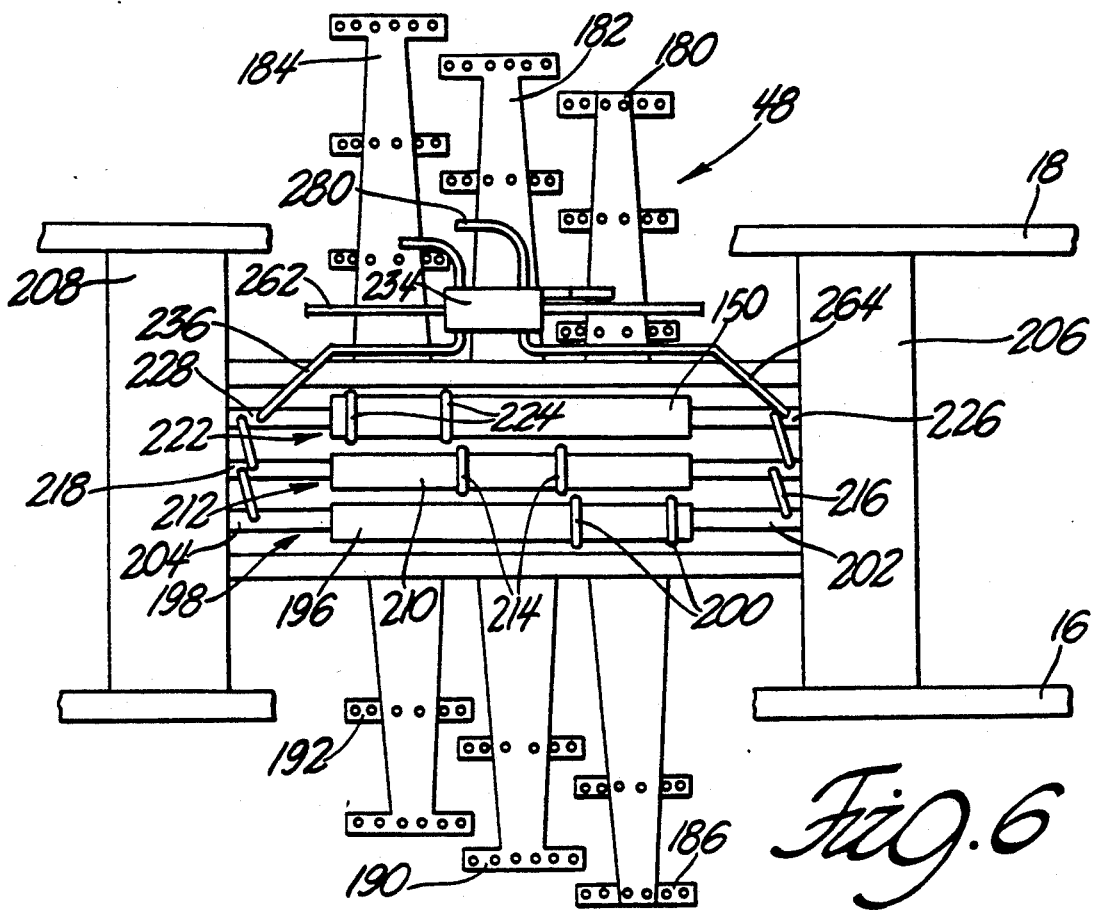
FIG. 6 is a bottom view of a floor slat drive assembly.

The transverse drive beam 180, as shown in FIG. 6 is clamped to the cylindrical barrel 196 of a hydraulic cylinder assembly 198 by U-clamps 200. The hydraulic cylinder assembly 198 has two piston rods 202 and 204 which are fixed to cross beams 206 and 208 that are secured to the spaced apart channel members 16 and 18 forward of the wheels and tires 22 and 24 and to the rear of the landing gear 26 and the hitch pin for attaching the semi-trailer 12 to a fifth wheel. Hydraulic fluid under pressure is supplied to the hydraulic cylinder 198 to move the A floor slats 50 back and forth. The transverse drive beam 182 is clamped to the cylindrical barrel 210 of a hydraulic cylinder assembly 212 by U-clamps 214. The hydraulic cylinder assembly 212 has two piston rods 216 and 218 which are fixed to the cross beams 206 and 208. Hydraulic fluid under pressure is supplied to the hydraulic cylinder assembly 212 to move the B floor slats 50 back and forth. The transverse drive beam 184 is clamped to the cylindrical barrel 220 of a hydraulic cylinder assembly 222 by u-clamps 224. The hydraulic cylinder assembly 222 has two piston rods, 226 and 228 which are fixed to cross beams 206 and 208. Hydraulic fluid under pressure as supplied to the hydraulic cylinder assembly 222 to move the C floor slats 50 back and forth.

Figure 5:
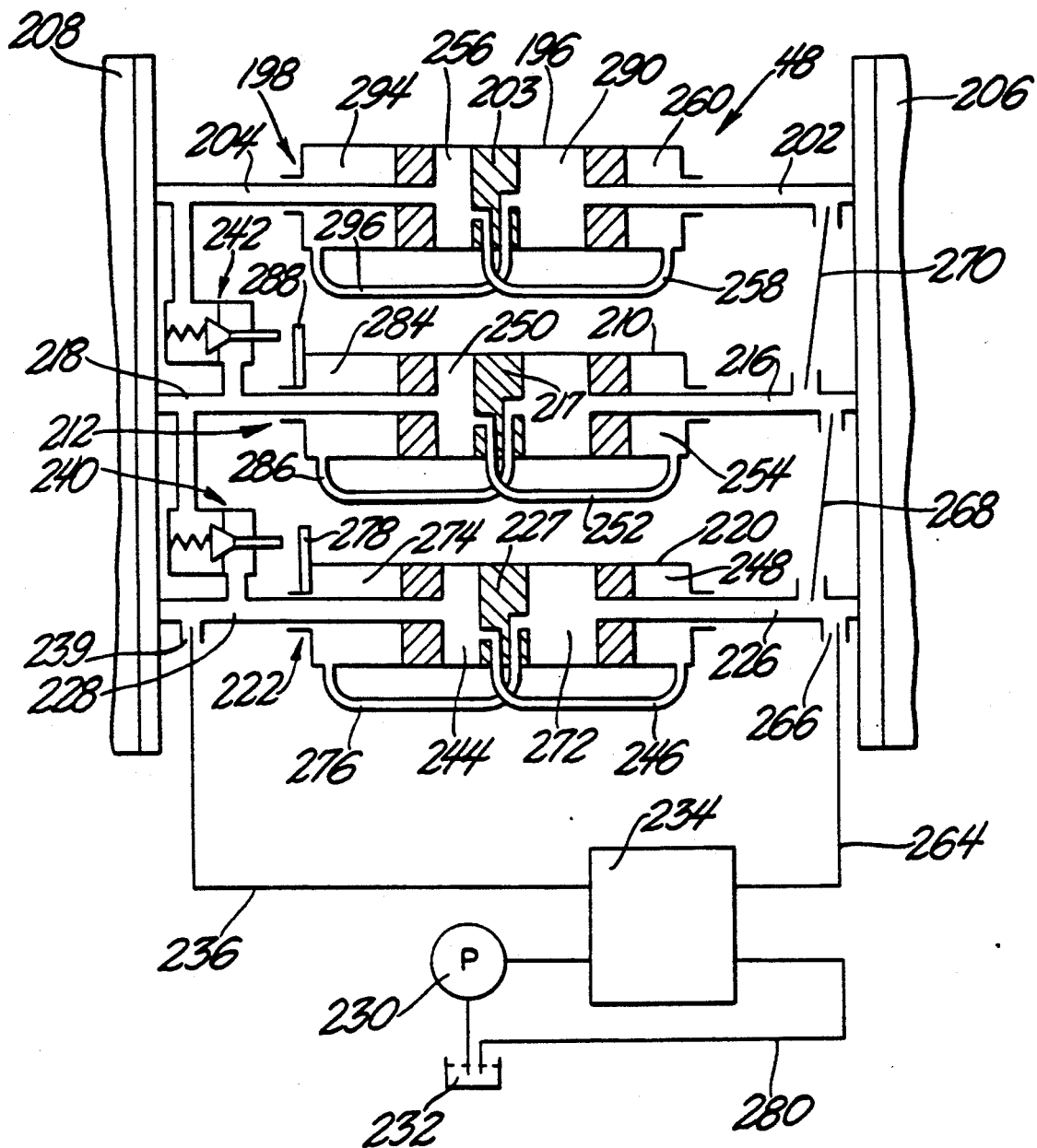
FIG. 5 is a schematic view of a floor slat drive system.

Hydraulic fluid is supplied to the hydraulic cylinder assemblies 198, 212 and 222 by a hydraulic pump 230 shown schematically in FIG. 5. The hydraulic pump 230 draws hydraulic fluid from a sump 232 and supplies the hydraulic fluid to a switching valve 234. The switching valve 234 supplies hydraulic fluid from the hydraulic pump 230 to a conduit 236 and port 238. The pressure of hydraulic fluid at the port 238 opens valves 240 and 242 so that hydraulic fluid under pressure is supplied simultaneously to hydraulic cylinder assemblies 198, 212 and 222 to move all the floor slats 50 to the rear together. Hydraulic fluid is supplied to the hydraulic cylinder assembly 222 through the piston rod 228 flows into chamber 244 and through a passage 246 to a chamber 248 and moves the cylindrical barrel 220 to the rear and toward cross beam 206. Hydraulic fluid under pressure from the port 238 passes through an open valve 240 and through the piston rod 218 of the hydraulic cylinder assembly 212. Hydraulic fluid supplied to the hydraulic cylinder assembly 212 through the piston rod 218 flows into a chamber 250 and through a passage 252 to a chamber 254 and moves the cylindrical barrel 210 to the rear and toward the cross beam 206. A portion of the hydraulic fluid under pressure from the port 238 that passes through the open valve 240 also passes through the open valve 242 and to the piston rod 204 of the hydraulic cylinder assembly 198. Hydraulic fluid supplied to the hydraulic cylinder assembly 198 through the piston rod 204 flows into chamber 256 and through a passage 258 to a chamber 260 and moves a cylindrical barrel 196 to the rear toward the cross beam 206. The pistons on the ends of the piston rods 202, 204, 216, 218, 226 and 228 are fixed to the piston rods and the cross beams 206 and 208 and do not move. The cylinder dividing walls 203, 217 and 227 are fixed to cylindrical barrels 196, 210 and 220 and move with the cylindrical barrels. The switch valve 234 is connected to transverse drive beam 180 and reverses the flow of hydraulic fluid from the hydraulic pump 230 when the valve rod 262, shown in FIG. 6, strikes the cross beam 206.

The delivery of hydraulic fluid under pressure from the hydraulic pump 230 through the conduit 264 and the port 266 supplies hydraulic fluid to the piston rod 226, to the piston rod 216 through conduit 268 and to piston rod 202 through conduit 270. The piston rod 226 supplies hydraulic fluid to chamber 272 and to chamber 274 through conduit 276. This moves the cylindrical barrel 220 of hydraulic cylinder assembly 222 forward toward the cross beam 208. Hydraulic cylinder assemblies 212 and 198 remain stationary because valves 240 and 242 are closed and fluid is locked in the chambers 250, 254, 256 and 260. When the cylindrical barrel 220 approaches the forward end of its movement a projection 278 on the cylindrical barrel 220 opens the valve 240. Opening the valve 240 allows fluid to return to the sump 232 from the chambers 250 and 254 and that allows hydraulic fluid under pressure supplied to the piston rod 216 to enter the chamber 282 and the chamber 284 through the conduit 286 and force the cylindrical barrel 210 to move forward. When the cylindrical barrel 210 of the hydraulic cylinder assembly 212 approaches the forward end of its movement a projection 288 on the cylindrical barrel 210 opens the valve 242. Opening the valve 242 allows fluid to return to the sump 232 from the chambers 256 and 260 and that allows hydraulic fluid under pressure supplied to the piston rod 202 to enter chamber 290 and chamber 294 through a conduit 296 and force the cylindrical barrel 196 to move forward toward the cross beam 208. When the cylindrical barrel 196 of the hydraulic cylinder assembly 198 reaches the forward end of its travel, a switching valve rod 262 contacts the cross beam 208 and reverses the flow of hydraulic fluid from the hydraulic pump 230 and connects the port 266 and the conduit 264 to the conduit 280 and sump 232. When a port 266 is connected to the sump 232 the chambers 272, 274, 282, 284, 290 and 294 are also connected to the sump 232.

The hydraulic system shown schematically in FIG. 5 is one of several hydraulic systems that are available and that have been used in reciprocating floor conveyors 10. There are other systems for reciprocating floor slats that will work. For example, it is possible to drive two groups of floor slats to the rear simultaneously while one group of floor slats moves forward. With this system a group of floor slats that reaches its forward limit of travel and a group of floor slats that reach its rear limit of travel reverse directions and the third group of floor slats continues to move to the rear. There are also systems which divide the floor slats into more than three groups.

A flat plate 300 is mounted under the rear ends of the floor slats 50 at the rear cargo discharge opening 40. The flat plate 300 extends forward from the rear most position of the floor slats 50 a distance that exceeds the maximum distance the floor slats are capable of being moved by the floor slat drive assembly 48. The guide beams 46 extend over the top of the flat plate 230 and are preferably anchored to the flat plate. During operation of the reciprocating floor conveyor 10 cargo is carried up to the rear discharge opening 40. The floor slats are then moved forward in groups without moving the cargo forward and the cargo is place on the flat plate 300. The floor slats 50 then convey more cargo to the rear and push the cargo on the flat plate 300 through the discharge opening 40.

A slant board 302 is attached to the front end wall 34 and extends from the right side wall 30 to the left side wall 32. The upper edge of the slant board 302 is flush with the inside surface of the front end wall 34. The slant board 302 extends downwardly and rearwardly from its upper edge to a bottom edge that is adjacent to the upper surface of the floor slats 50 and that is to the rear of rear most position of the front end surfaces of the floor slats 50.

Preferred embodiments of the invention have been described in detail that are examples only and the invention is not restricted thereto. It will be easily understood by those skilled in the art that modifications and variations can be made within the scope of this invention.

I claim:

1. A reciprocating floor conveyor having cross beams; a plurality of parallel spaced apart guide beam assemblies each of which has at least one guide beam assembly section attached to the cross beams; bearings mounted on the guide beam assemblies; a plurality of elongated floor slats supported by the bearings; and a floor slat drive assembly connected to the floor slats and operable to reciprocate the floor slats back and forth to convey material supported by the floor slats, and wherein each bearing includes an upper section with an upwardly facing bearing surface that engages and supports a floor slat and extends substantially the full length of the guide beam assembly section upon which it is mounted, sides that extend downwardly from the upper section with an upwardly facing bearing surface, a generally downwardly facing surface on each side that cooperates with a floor slat to limit vertical movement of the floor slat and to enclose the upwardly facing bearing surface from one end of the guide beam assembly section to the other end, and fasteners that secure each bearing to a guide beam assembly section.

2. A reciprocating floor conveyor as set forth in claim 1 wherein each guide beam assembly has a front guide beam assembly section that extends from the front of the reciprocating floor conveyor to the floor slat drive assembly and a rear guide beam assembly section that extends from the floor slat drive assembly to a rear reciprocating floor conveyor discharge.

3. A reciprocating floor conveyor, as set forth in claim 1 wherein each floor slat includes a center portion with a lower bearing engaging surface, an upper cargo support surface, a pair of sides the extend downwardly from the center portion, flanges on the sides with bearing engaging surfaces that cooperate with the generally downwardly facing surface on each side of a bearing to limit vertical movement of the floor slat relative to the upwardly facing bearing surface on a bearing which supports the floor slat and which encloses the upwardly facing bearing surface from one end of the guide beam assembly section to the other end.

4. A reciprocating floor conveyor, as set forth in claim 2 wherein each floor slat includes a center portion with a lower bearing engaging surface, an upper cargo support surface, a pair of sides the extend downwardly from the center portion, flanges on the sides with bearing engaging surfaces that cooperate with the generally downwardly facing surface on each side of a bearing to limit vertical movement of the floor slat relative to the upwardly facing bearing surface on a bearing which supports the floor slat and which encloses the upwardly facing bearing surface from one end of the guide beam assembly section to the other end.

5. A reciprocating floor conveyor as set forth in claim 4 wherein the sides of the bearing can be cammed inward toward the guide beam assembly to allow a floor slat to move vertically into contact with the upwardly facing bearing surface on a bearing during assembly of the reciprocating floor conveyor.

6. A reciprocating floor conveyor as set forth in claim 4 wherein the sides of the bearing have flanges that extend inward toward each other, contact the guide beam assembly to center the bearing on the guide beam assembly and wherein the flanges on the sides of the bearing are flexible and will deform to allow the sides of a bearing to be moved toward each other to permit a floor slat to be moved vertically into contact with the upwardly facing bearing surface on a bearing during assembly of the reciprocating floor conveyor.

7. A reciprocating floor conveyor as set forth in claim 4 wherein the sides of the bearing are in contact with the sides of the guide beam assembly, the sides of the bearing each have a flange that extends outwardly away from the side wall and away from the flange on the other side wall of the same bearing, the generally downwardly facing surface on each side that cooperates with a floor slat to limit vertical movement of a floor slat is on the flanges that extend outwardly from the sides of the bearing and wherein the flanges that extend outwardly away from the side walls are deformable inwardly toward the side walls to permit a floor slat to be moved vertically into contact with the upwardly facing bearing surface on the bearing during assembly of the reciprocating floor conveyor.

8. A reciprocating floor conveyor as set forth in claim 7 wherein the sides of the bearing each include a main side section that is in contact with the guide beam assembly and a flange which extends outwardly from a surface of the side that is not in contact with the guide beam assembly and wherein the main side section includes a recess that receives the flange when the flange is deformed inwardly toward the side wall.

9. A reciprocating floor conveyor as set forth in claim 8 wherein the outside width of the main side sections of the bearing sides is substantially the same as distance between the flanges on the sides of the floor slats.

* * * * *

UNITED STATES PATENT AND TRADEMARK OFFICE
CERTIFICATE OF CORRECTION

PATENT NO. : 5,325,957
DATED      : July 5, 1994
INVENTOR(S) : Arthur L. Wilkens It is certified that error appears in the above-identified patent and that said Letters Patent is hereby corrected as shown below:

Column 1, line 13, delete "va" and insert therefor --van--.

Column 4, line 5, delete "staring" and insert therefor --starting--.

Column 7, line 6, after "feet" delete "or".

Column 8, line 7, delete "a" and insert therefor --as--.

Column 12, line 26, delete "the" and insert therefor --that--.

Column 12, line 38, delete "the" and insert therefor --that--.

Signed and Sealed this

Ninth Day of July, 1996

*Attest:*

BRUCE LEHMAN

*Attesting Officer*     *Commissioner of Patents and Trademarks*